June 2, 1964     B. H. HAMILTON     3,135,910
CONSTANT CURRENT RECTIFIER POWER SUPPLY SYSTEM
Filed Nov. 17, 1959
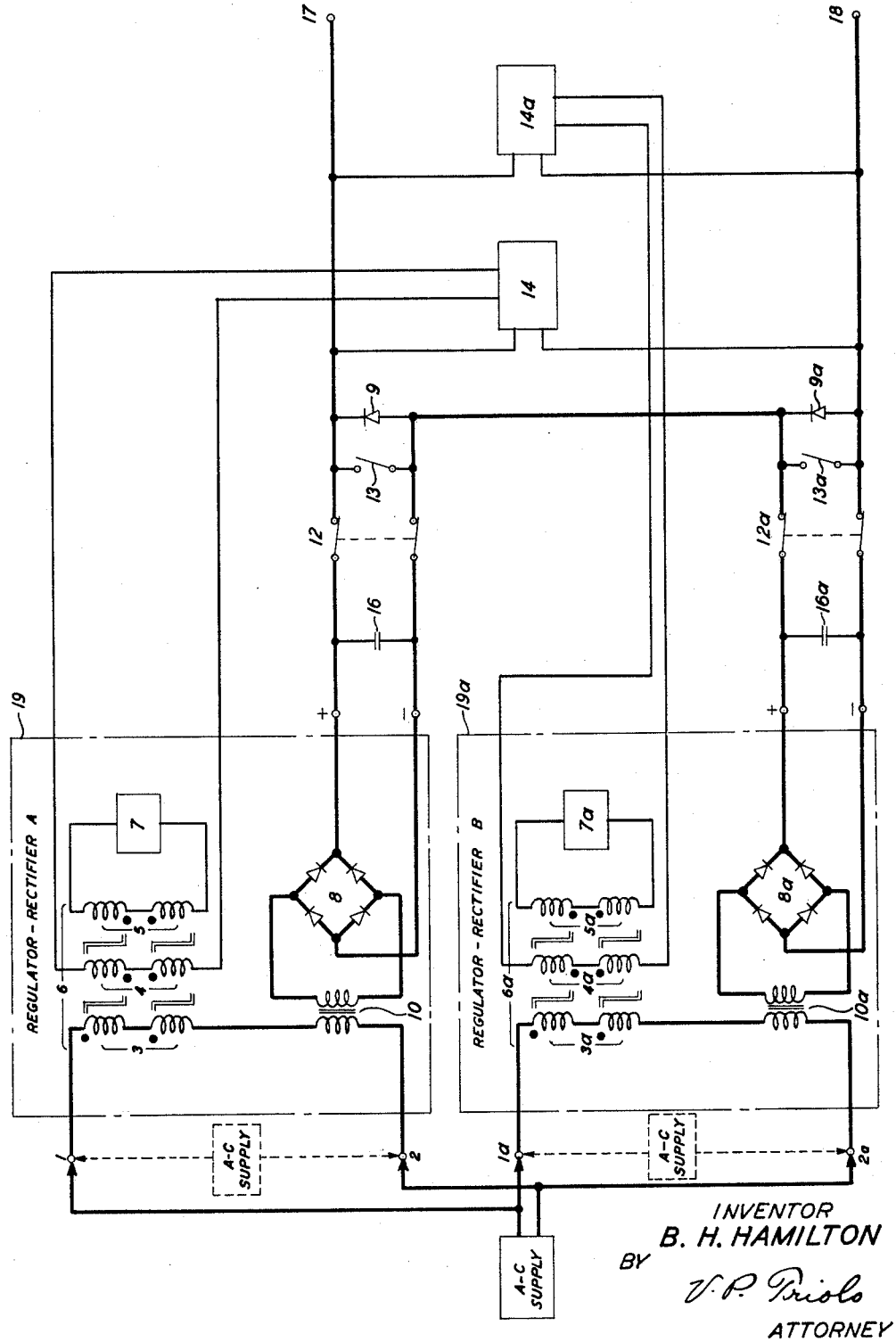
INVENTOR
B. H. HAMILTON
BY
*V. P. Priolo*
ATTORNEY United States Patent Office 3,135,910
Patented June 2, 1964

3,135,910
CONSTANT CURRENT RECTIFIER POWER
SUPPLY SYSTEM
Billy H. Hamilton, Summit, N.J., assignor to Bell Telephone Laboratories, Incorporated, New York, N.Y., a corporation of New York
Filed Nov. 17, 1959, Ser. No. 853,559
4 Claims. (Cl. 321—16)

This invention relates to rectifier-type power supply systems and, more particularly, to a system adapted to provide a constant current unidirectional output from an alternating-current source.

In many communication systems, it is important to employ power supply systems which will supply a direct current of constant magnitude to a given load. It is often desirable that such power supply systems possess an extremely high degree of reliability. It may also be desirable to have a system with a high order of absolute current stabilization.

A system meeting these requirements may have particular utility in remotely located equipment, such as repeater stations supplied from a distant source. Remotely located repeater stations requiring such a system are encountered in submarine cable applications. In applications of the latter and similar types, it is essential that the current supplied over the line to the remotely located repeater station be constant, with an order of stability higher than one percent. A continuous supply is of primary importance. A power loss or failure, in addition to causing a loss of service, would result in cooling and subsequent reheating of the repeaters, which could tend to reduce the life of the electron tubes.

In the past, systems having the desirable high degree of reliability and absolute current stabilization and capable of providing currents of constant magnitude were usually realized by using parallel connected regulator-rectifier units. This invention is directed to means for achieving these characteristics by connecting regulator-rectifier units in series rather than in parallel.

It has also been necessary in communication systems to make provision for emergencies arising from transient interruption and power supply failures. Transients and other disturbances, such as those encountered in transoceanic cables, have been regulated by so-called "fine-coarse" systems, i.e., systems in which there is fast response to minimize disturbances of relatively short duration (transients) and the initial effect of other disturbances, and slow response to eliminate said other disturbances. These systems usually comprise servomechanisms and vacuum tubes as does the system described in United States Patent 2,617,087, "Current Supply Apparatus" granted to G. W. Meszaros, on November 4, 1952. In accordance with prior art practice, the system described in this patent also employs parallel connected regulator-rectifier units to achieve the desired reliability.

According to this invention, the "fine-coarse" principle of regulation is achieved by using solid-state devices, such as, a saturable reactor, asymmetrically conducting devices and a power transformer. Basically, the proposed system comprises two full-wave rectifiers with regulation features connected in series, for optimum performance and reliability, to a load. Each regulator-rectifier comprises a saturable reactor including main, control and reference windings, an alternating-current source, a power transformer, a reference current source, a rectifier bridge, a current buffer capacitor, switching means for maintenance purposes, and a transient minimizing and by-passing asymmetrically conducting device.

An object of this invention is to provide a direct-current power supply with a transient-minimized constant current output of high stability operated from one or several sources of alternating current.

Another object of this invention is to provide automatic protective arrangements to prevent high voltage damage to the load.

The nature of the invention and its distinguishing features and advantages will be more clearly understood from the following detailed description and the accompanying drawing, the single figure of which is a schematic view of an embodiment of the invention.

The proposed system comprises two full-wave regulator-rectifiers A and B connected in series to a load, such as a submarine cable, across terminals 17 and 18. Since regulator-rectifier B is identical to regulator-rectifier A, the components are represented by the same reference numbers with the suffix "a" added to the numerals of regulator-rectifier B. The following description will be with reference to regulator-rectifier A but may be adapted to regulator-rectifier B simply by adding the suffix "a" to each appearance of a numeral.

The main windings 3 of the saturable reactor 6 are connected in series with the primary of the power transformer 10 and the alternating-current supply connected to terminals 1 and 2. (It is to be understood that regulator-rectifiers A and B may be individually connected to separate alternating-current supplies.) The current flow in the series loop comprising the main windings 3 of the saturable reactor 6, the primary winding of the power transformer 10, and the alternating-current supply connected to terminals 1 and 2 is regulated by the main windings 3 of the saturable reactor 6. These windings are, in turn, magnetically coupled by the saturable core of the saturable reactor 6 to the reference windings 5 and control windings 4 of the reactor. The dot convention used in the drawings is such that at any instant the direction of the voltage induced by the flux in the coils on a particular common core is the same at each appearance of the dot. While the coils should be, therefore, physically connected so as to achieve this result, they are drawn in the manner shown only for simplicity of drawing. As shown in the drawing, the direction of the voltage in one winding of both the control 4 and reference 5 windings is in the opposite direction to the voltage in one of the windings of the main windings 3 while the direction of voltage in the remaining winding of the main 3, control 4, and reference 5 windings is in the same direction. Because of the saturable properties of the core material of the saturable reactor 6 and the relative polarities of the windings, the current in the series loop of which the main windings 3 are a part, will be a square wave proportional to the flux established by the control 4 and reference 5 windings. The reference windings 5 are connected to a reference constant current regulated supply 7, thereby keeping the current in the series loop of which main windings 3 are a part to a desired reference value. The control windings 4 are connected to a load sensing or voltage monitoring device 14. In order to prevent high voltage damage to a load, such as a submarine cable, the voltage monitoring device provides a current cut-off or "current droop" at a predetermined value of output voltage, i.e., the output current is reduced to a relatively negligible value. The voltage monitoring device 14 may be any known device that will provide the required control voltage feedback to the saturable reactor control windings 4 in response to excessive load voltage across the load connected to terminals 17 and 18, the control winding voltage feedback at the predetermined value of current cut-off being such as to reduce the current flow through the main winding to a negligible value. A voltage monitoring system such as the one described in United States Patent 2,798,167 could be used.

The secondary of the transformer 10 is connected to a full-wave bridge type rectifier 8. Across the bridge rectifier, a current buffer capacitor 16 and an asymmetrically conducting device 9 are connected in parallel. By using the capacitor 16, as a current buffer, the output currents of the rectifiers are not required to be instantaneously equal to each other and to the total cable current. The use of capacitor 16 is necessary in view of the possibility of a need for operating from independent alternating-current sources with random relative phase and the phase variations inherently caused by the circuit elements. The function of the asymmetrically conducting device can best be described as follows:

Since both the rectifiers (constant current sources) are in series they are both delivering the same current, for example, .50 ampere. If due to a "trouble" situation, a transient condition arises so that the current of one of the regulator-rectifiers, e.g., regulator-rectifier 19, falls to .48 ampere while the other regulator-rectifier 19a remains constant at .50 ampere, .02 ampere will flow through the asymmetrically conducting device 9, thus both minimizing the transient and keeping the load current constant at .50 ampere. The asymmetrically conducting device 9 provides a quick means for maintaining the constant output until the relatively slower saturable reactor 6 gradually adjusts. In addition, the asymmetrically conducting device provides a shunt by-pass in the case of an open-circuit fault internal to a regulator-rectifier.

Manual switching means 12 are provided to remove the regulator-rectifier from service for repair purposes. Switching means 13 are provided to by-pass both the asymmetrically conducting device and the regulator-rectifier in the event of an internal fault in the regulator-rectifier.

Although only two serially connected regulator-rectifiers are shown in the drawing, others may be added in a similar manner. An asymmetrically conducting device 9, a capacitor 16, and switching means 12 and 13 would be used, as shown, with each regulator-rectifier.

Since changes may be made in the above-described arrangement, and different embodiments may be devised by those skilled in the art without departing from the spirit and scope of the invention, it is to be understood that all matter contained in the foregoing description and in the accompanying drawing is illustrative of the application of the principles of the invention, and is not to be construed in a limiting sense.

What is claimed is:

1. A constant current rectifier power supply system comprising an alternating-current source, a plurality of regulator-rectifiers, each of said regulator-rectifiers comprising a transformer having primary and secondary windings, a reference current source, a rectifier bridge having an input and an output, and a saturable reactor having reference, main and control windings, means for connecting the reference current source in each of said plurality of regulator-rectifiers to its corresponding reference windings, means for serially connecting the main windings of said saturable reactor in each of said regulator rectifiers, the corresponding primary winding of said transformer and said alternating-current source, means for connecting the secondary winding of said transformer in each of said regulator-rectifiers to the input of its corresponding rectifier bridge, a plurality of asymmetrically conducting devices, means for connecting an individual one of said asymmetrically conducting devices across the output terminals of each of said rectifier bridges, a load, means for serially connecting said asymmetrically conducting devices and said load, individual detecting means associated with each of said regulator-rectifiers, said detecting means being responsive to load voltage in excess of a predetermined value to provide an output signal suitable for saturable reactor control, means connecting said detecting means to said saturable reactor control windings to transmit said output signal thereto and thereby reduce the current in said main saturable reactor windings to a relatively negligible value.

2. A constant current rectifier power supply system comprising an alternating-current source, a plurality of regulator-rectifiers, each of said regulator-rectifiers comprising a transformer having primary and secondary windings, a reference current source, a rectifier bridge having an input and an output, and a saturable reactor having reference, main and control windings, means for connecting the reference current source in each of said plurality of regulator-rectifiers to its corresponding reference windings, means for serially connecting the main windings of said saturable reactor in each of said regulator-rectifiers, the corresponding primary winding of said transformer and said alternating-current source, means for connecting the secondary winding of said transformer in each of said regulator-rectifiers to the input of its corresponding rectifier bridge, a plurality of asymmetrically conducting devices, means for connecting an individual one of said asymmetrically conducting devices across the output terminals of each of said rectifier bridges, a plurality of capacitors, means for connecting an individual one of said capacitors across each of said asymmetrically conducting devices, a load, means for serially connecting said asymmetrically conducting devices and said load, individual detecting means associated with each of said regulator-rectifiers, said detecting means being responsive to load voltage in excess of a predetermined value to provide an output signal suitable for saturable reactor control, means connecting said detecting means to said saturable reactor control windings to transmit said output signal thereto and thereby reduce the current in said main saturable reactor windings to a relatively negligible value.

3. A constant current rectifier power supply system comprising a plurality of regulator-rectifiers, each of said regulator-rectifiers comprising a transformer having primary and secondary windings, a reference current source, a rectifier bridge having an input and an output, an alternating-current source, and a saturable reactor including reference, main and control windings, means for connecting the reference current source in each of said plurality of regulator-rectifiers to its corresponding reference windings, means for serially connecting the main windings of said saturable reactor in each of said regulator-rectifiers, the corresponding alternating-current source and the corresponding primary winding of said transformer, means for connecting the secondary winding of said transformer in each of said regulator-rectifiers to the input of its corresponding rectifier bridge, a plurality of asymmetrically conducting devices, means for connecting an individual one of said asymmetrically conducting devices across the output terminals of each of said rectifier bridges, a load, means for serially connecting said asymmetrically conducting devices and said load, individual detecting means associated with each of said regulator-rectifiers, said detecting means being responsive to load voltage in excess of a predetermined value to provide an output signal suitable for saturable reactor control, means connecting said detecting means to said saturable reactor control windings to transmit said output signal thereto and thereby reduce the current in said main saturable reactor windings to a relatively negligible value.

4. A constant current rectifier power supply system comprising a plurality of regulator-rectifiers, each of said regulator-rectifiers comprising a transformer having primary and secondary windings, a reference current source, a rectifier bridge having an input and an output, an alternating-current source, and a saturable reactor including reference, main and control windings, means for connecting the reference current source in each of said plurality of regulator-rectifiers to its corresponding reference windings, means for serially connecting the main windings of said saturable reactor in each of said regulator-rectifiers, the corresponding alternating-current source and the corresponding primary winding of said transformer, means for connecting the secondary winding of said transformer in each of said regulator-rectifiers to the input of its corresponding rectifier bridge, a plurality of asymmetrically conducting devices, means for connecting an individual one of said asymmetrically conducting devices across the output terminals of each of said rectifier bridges, a plurality of capacitors, means for connecting an individual one of said capacitors across each of said asymmetrically conducting devices, a load, means for serially connecting said asymmetrically conducting devices and said load, individual detecting means associated with each of said regulator-rectifiers, said detecting means being responsive to load voltage in excess of a predetermined value to provide an output signal suitable for saturable reactor control, means connecting said detecting means to said saturable reactor control windings to transmit said output signal thereto and thereby reduce the current in said main saturable reactor windings to a relatively negligible value.

References Cited in the file of this patent

UNITED STATES PATENTS

| | | |
|---|---|---|
| 2,743,152 | Carleton | Apr. 24, 1956 |
| 2,817,055 | Taubenslag et al. | Dec. 17, 1957 |
| 2,945,172 | Bixby | July 12, 1960 |

FOREIGN PATENTS

| | | |
|---|---|---|
| 1,072,238 | France | Mar. 10, 1954 |
| 1,007,861 | Germany | Mar. 9, 1957 |